Feb. 28, 1928.
R. PLUMB
JOINT FOR RODS
Filed Aug. 18, 1921
1,660,455
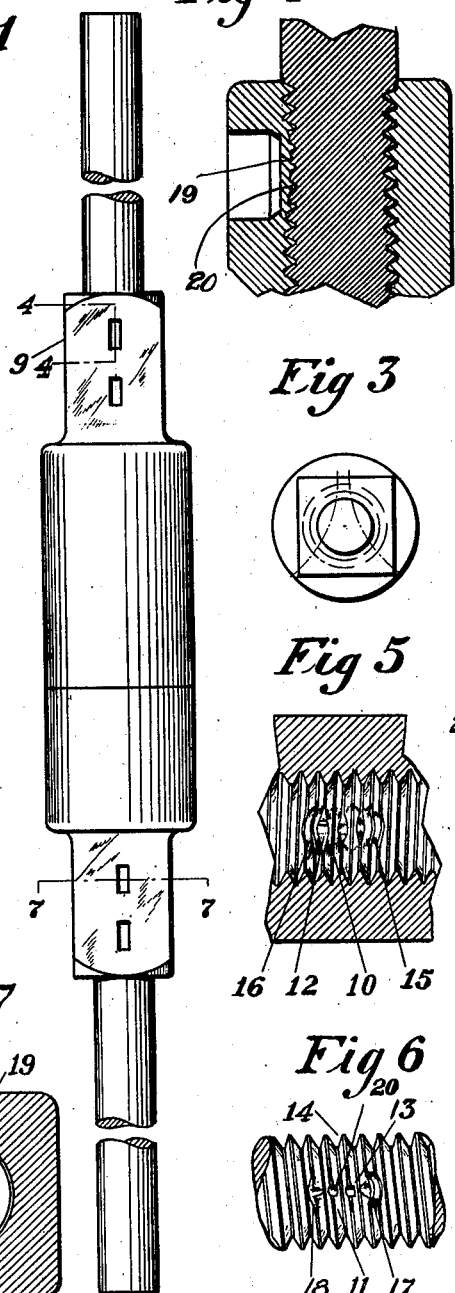
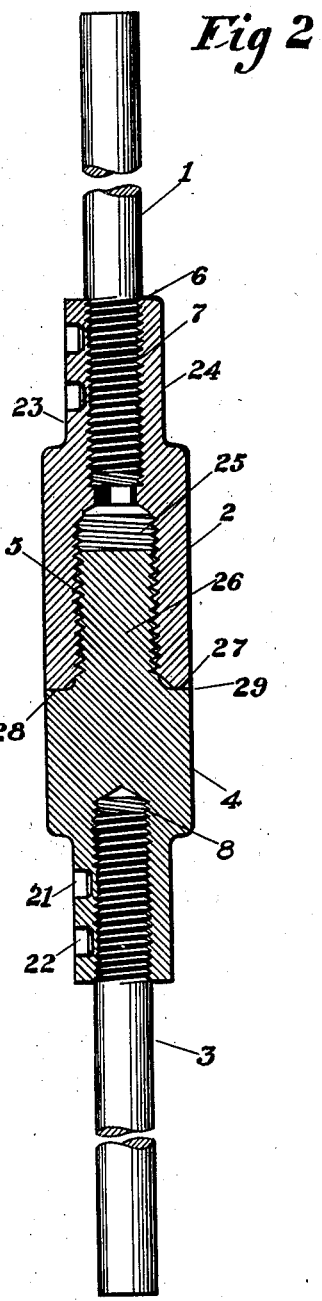
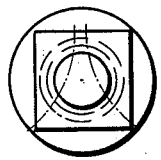
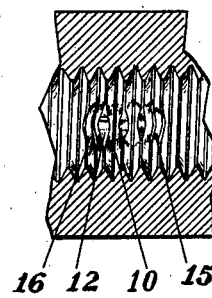
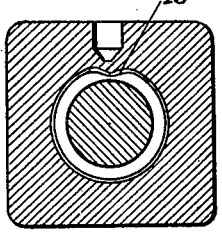
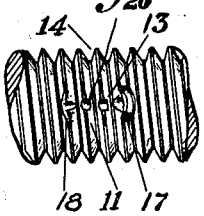
Inventor
RALPH PLUMB
By his Attorney Patented Feb. 28, 1928.

1,660,455

UNITED STATES PATENT OFFICE.

RALPH PLUMB, OF BUFFALO, NEW YORK.

JOINT FOR RODS.

Application filed August 18, 1921. Serial No. 493,277.

My present invention relates to couplings for detachably securing together adjoining ends of rod sections and has its preferred application to the rod sections of drills used for boring deep holes of small calibre into the earth, such as oil, salt or artesian wells.

An object of the invention is to provide a simple, inexpensive and durable coupling joint for the above purpose.

Another object of the invention is to provide an economical method for making rod coupling joints, which method can be executed without the use of skilled labor and which shall dispense with the need for hot-working.

According to one feature of the invention, complementary male and female coupling members are used, each coupling member having a threaded socket engagement with the rod end to which it is secured, the thread being preferably modified in a special manner to prevent unscrewing.

According to another feature of the invention, certain of the threads of the socket element are formed to extend substantially along a straight line or chord for a portion of the periphery thereof, the rod member having a complementary conformation.

According to another feature of the invention, the malleable steel coupling member has a plurality of small inwardly extending lugs at localized parts of threads, fitting into corresponding depressions in the tops of the rod threads.

According to another feature of the invention one or more of the coacting threads of the rod and coupling members extend laterally of the true helical course at a localized part. Preferably one of the threads is deflected toward the left and another thread toward the right. In the preferred embodiment the lugs are provided near the centers of the flattened areas of successive threads and the lateral deflection is applied at other threads.

Preferably, the socket member threaded onto the rod is provided with a squared exterior at which it can be readily grasped by a wrench for tightening the coupling.

A desirable method for producing the coupling joint is by the simple application of a high pressure upon a definite localized portion of one side of the coupling member after the same has been threaded upon the rod end.

According to the preferred method, the socket member with the rod threaded thereinto is inserted in a punch press provided with projecting dies, and pressure is applied to the cold metal at a localized portion of one side of the squared portion to force the malleable steel of the coupling member inwardly to modify the helical course of the coacting threads in such manner as to offer obstruction against unthreading.

In the preferred embodiment, the die consists of a pair of projections of relatively small thickness, and substantial width, the coupling member being inserted into the punch, so that the width of the dies extends longitudinally thereof. As a result of this punching operation, the various features of thread modification referred to are produced. The die will form a deep depression in the coupling member and will flatten the adjacent portions of the threads of the coupling member against the corresponding threads of the rod member and will further strike relatively sharp lugs inwardly from the tops of the socket threads of the coupling member to fit into corresponding depressions formed thereby in the tops of the rod threads. Furthermore, the edges of the die will force the threads adjacent thereto laterally outwardly to deflect the same from their true helical course. Furthermore, the intermediate flattened threads will be deflected inwardly more than the other threads.

In the accompanying drawings, in which is shown one of various possible embodiments of the several features of this invention,

Fig. 1 shows a side view of a preferred form of rod coupling,

Fig. 2 is a view in longitudinal section thereof,

Fig. 3 is an end view thereof,

Fig. 4 is a sectional view on an enlarged scale taken on the line 4—4 of Fig. 1, Fig. 5 is a plan view of the interior of the coupling showing the thread modification, Fig. 6 is a view similar to Fig. 5 of the complementary portion, and;

Fig. 7 is a sectional view taken on the line 7—7 of Fig. 1.

Referring now to the drawings, I have shown a rod end 1 bearing a female coupling member 2 and a rod end 3 bearing a male coupling member 4, the coupling members having coacting threads 5, so that they may be readily attached or detached from each other.

The coupling members are preferably of malleable steel and are secured to their rods by a connection which will now be set forth, it being understood that the connections for the male and for the female coupling member are preferably identical. The end of the rod 1 is threaded as at 6 for a portion of the length thereof, several times the diameter. The malleable steel coupling members 2 and 4 have socket ends 7 tapped as at 8 to accommodate the threaded rod ends. The end of the coupling member adjacent the tapped portion is squared as at 9 to facilitate application of a wrench to tighten the coupling elements 2 and 4 together in connecting the drill rod sections.

In the preferred embodiment, the thread is modified from its true helical course to prevent unscrewing. The description will be confined to the joint between rod 1 and coupling 2, it being understood that the identical form of joint is used between rod 3 and element 4. Preferably the threads of the coupling member are flattened as at 10 throughout a fraction of the periphery thereof, rod 1 having a complementary flattened conformation 11, the flat on the socket thus offering a substantial obstruction against relative rotation of the rod along its thread. Preferably, also, integrally formed lugs 12 are provided, extending between successive threads of the coupling member and projecting into corresponding depressions 13 in the tops of the threads 14 on the rod member. The lugs 12 are preferably in alignment with each other on successive threads. It will be apparent that the lugs fitting in the depressions offer a positive obstruction against unthreading of the rod. A pair of the coacting threads 15 and 17 on the socket and rod are preferably deflected or distorted laterally toward the left of the true helical course, and threads 16 and 18 are similarly deflected toward the right, thus affording a wedging conformation to prevent turning of the rod relative to the coupling in either direction. Preferably, also, the coacting flattened thread portions of some threads of the socket and the rod are deflected inwardly as at 19 more than are other threads nearer the free end, thus affording a further wedging hold against unscrewing.

Although the flattening of the threads, the provision of the lugs on the socket fitting into corresponding depressions in the rod member, the lateral deflection or distortion of the threads from their true helical course and the extra inward deflection of certain threads may be relied upon, each independently of the other, for locking the threaded joint to prevent unscrewing, I prefer to employ all four features of the lock in combination.

In the preferred embodiment, the locking structure set forth is duplicated, being disposed at the two rectangular conformations 21 and 22.

According to the preferred method of forming the joint described, a press is provided with a punch, preferably rectangular in cross-section and of a width preferably greater than its thickness. The front face of the punch may be narrowed by beveling as indicated in Fig. 7. The coupling member with the rod screwed into it is placed in the press in such position that the width of the punch extends longitudinally along one side of the socket member, as will be clear from the drawings. In the preferred embodiment a pair of aligned punches corresponding to rectangular depressions 21 and 22 are employed. Pressure is applied, driving the punches into the upper side 23 of the squared portion the proper depth to cause substantial flow of the metal supporting the threads thereby causing the threads of the coupling to press with great force on the threads of the rod. It is found upon cutting open a coupling joint made in the manner described, that it has precisely the conformation shown in the drawings and heretofore described. The threads are flattened as at 10 and 11, lugs 12 are formed on the coupling threads fitting into corresponding depressions 13 in the rod, threads 15—16 and 17—18 are deflected laterally out of their helical course, apparently by the lateral flow of the metal displaced by the punch and the flattened area is bent inwardly as at 19. The cross-section of the rod is preferably not reduced or weakened at any point, the flattening and distortion being confined to the threads.

Except at the areas described, the coacting threads are preferably not deformed. It is seen that the force of the punch is transmitted to the base plate of the punch press through the entire area of the side 24 opposite the side 23 of the squared coupling member upon which the die operated. Thus, the pressure is distributed through the socket and the rod along lines substantially those indicated in dot and dash in Fig. 3. The cross-sectional area over which the pressure is applied, increasing from side 23 to side 24, the pressure per unit area which is very high at the side 23 becomes very much less at side 24. For this reason the thread of the rod is modified at the side thereof adjacent the point of application of the die, while the lesser force per unit area transmitted to the lower portion of the rod will tend to force the rod thread into intimate coaction with the thread in the malleable member without flattening or otherwise changing or distorting the thread at these points.

By applying the pressure by two dies in alignment with each other, it will be seen that the formation of the obstructions for the region corresponding to each of said dies is assured, any slight buckling of the metal of the socket between or beyond the die depressions being of no consequence. The firm grip and the formation of the obstructions is thus assured by a plurality of successions of threads.

The socket 25 of the female coupling member is preferably deeper than the plug 26 of the male coupling member, so that the adjoining end surfaces 27, 28 of the coupling members can be brought into intimate contact with each other, as at 29 to relieve the stress upon threads 5 in the use of the drill and to prevent unscrewing.

By a destruction test, I have found that the rod coupling joint, shown and described, has enormous strength and that the rod itself will twist and bend under the application of high torque while the locked thread joint remains firm.

It will thus be seen that my method provides at small expense a wholly reliable joint, dispensing entirely with the need for hot-working. Mere unskilled labor is required for expeditious production. Moreover, the construction does not require any differentiation between the formation of the rod ends, which are simply threaded as noted, in identical manner, the male and female coupling members being secured at rod ends, by the simple method set forth.

I claim :—

1. In a coupling for pump rods, in combination, a threaded rod end, a malleable coupling member having a tapped socket end threaded upon said rod end, a part of the wall of the bore of said socket extending across threads on said rod and below the tops thereof, said threads being correspondingly indented to receive the inwardly extending part of the wall.

2. In a coupling for pump rods, in combination, a threaded rod end, a complementary malleable coupling member having a tapped socket threaded upon said rod end, means retaining said coupling against unthreading from the rod end including obstructions integral with said socket and longitudinal thereof and extending from the bore thereof inwardly, intimately into contact with a plurality of threads on said rod and across the path of unthreading movement, said threads being correspondingly indented to receive the inwardly extending part of the wall.

3. In a coupling for pump rods, in combination, a threaded rod end, a malleable coupling member having a tapped socket end threaded upon said rod end, lugs at localized portions of certain of the threads on the coupling member extending inwardly into corresponding depressions in the coacting rod threads, one pair of coacting threads on the rod and coupling extending laterally of the true helical course toward one side, and a second pair of coacting threads on the rod and coupling extending similarly toward the opposite side.

4. In a coupling for pump rods, in combination, a threaded rod end, a malleable coupling member having a tapped socket end threaded upon said rod end, at least one of the coacting threads of the rod and coupling being flattened and in intimate contact with each other, and lugs extending inwardly from said socket member at the center of said flattened portion into corresponding depressions in said rod threads.

5. In a coupling for pump rods, in combination, a threaded rod end, a malleable coupling member having a tapped socket end threaded upon said rod end, at least one of the coacting threads of both the rod and coupling being flattened and in intimate contact with each other, a pair of the coacting threads of the rod and coupling extending laterally of their true helical course.

6. In a coupling for pump rods, in combination, a threaded rod end, a malleable coupling member having a tapped socket end threaded upon said rod end, at least one of the coacting threads of the rod and coupling being flattened and in intimate contact with each other, a pair of the threads of the socket and rod at one side of said flattened portion being deflected from their true helical course toward the left and a second pair of threads at the opposite side of said flattened portion being similarly deflected toward the right.

7. In a coupling for pump rods, in combination, a threaded rod end, a malleable coupling member having a tapped socket end threaded upon said rod end, at least one of the coacting threads of the rod and coupling being flattened and in intimate contact with each other, a pair of the threads of the socket and rod at one side of said flattened portion being deflected from their true helical course toward the left and a second pair of threads at the opposite side of said flattened portion being similarly deflected toward the right, and lugs extending inwardly from the center of said flattened portion on said socket into corresponding depressions in the rod threads.

8. In a coupling for pump rods, in combination, a threaded rod end, a complementary malleable coupling member having a tapped socket threaded upon said rod end, and means retaining said coupling member against unthreading from the rod comprising obstructions integral with said socket and forming a key extending across a plurality of threads of said rod, the said threads being correspondingly indented to form a seat receiving said key.

Signed at Buffalo, in the county of Erie and State of New York, this 16th day of August, A. D. 1921.

RALPH PLUMB.